United States Patent [19]

Jadamus et al.

[11] Patent Number: 4,656,220
[45] Date of Patent: Apr. 7, 1987

[54] THERMOPLASTIC COMPOSITIONS BASED ON POLYPHENYLENE ETHERS AND POLYOCTENYLENES, AND METHOD OF MANUFACTURING SAME

[75] Inventors: Hans Jadamus, Marl; Wilfried Ribbing, Dorsten; Roland Feinauer; Wolfgang Schafer, both of Marl, all of Fed. Rep. of Germany

[73] Assignee: Chemische Werke Huls Aktiengesellschaft, Marl, Fed. Rep. of Germany

[21] Appl. No.: 784,509

[22] Filed: Oct. 4, 1985

[30] Foreign Application Priority Data

Oct. 6, 1984 [DE] Fed. Rep. of Germany ....... 3436780
May 22, 1985 [DE] Fed. Rep. of Germany ....... 3518277

[51] Int. Cl.[4] ............................................ C08L 71/04
[52] U.S. Cl. .................................... 524/502; 523/309; 523/335; 523/340; 524/501; 525/68; 525/132; 525/905
[58] Field of Search .................. 525/68, 132, 905; 523/309, 335, 340; 524/502, 501

[56] References Cited

U.S. PATENT DOCUMENTS 3,660,531 5/1972 Lauchlan ........................... 525/905
4,164,493 8/1979 Cooper et al. ..................... 525/132
4,480,057 10/1984 Sano .................................. 525/92

Primary Examiner—Jacob Ziegler
Attorney, Agent, or Firm—Oblon, Fisher, Spivak, McClelland & Maier

[57] ABSTRACT

The invention relates to thermoplastic compositions comprising mixtures of
(A) 100 parts by wt. polyphenylene ethers;
(B) 2–40 parts by wt. polyoctenylene; and
(C) the following additives in amounts given as wt. % of the overall molding or forming composition:
up to 50 wt. % reinforcing and filling materials;
up to 60 wt. % condensation polymers;
up to 15 wt. % flame retardants; and
up to 5 wt. % other additives.

The invention further relates to methods for producing such mixtures in the molten state and in solution.

17 Claims, No Drawings

THERMOPLASTIC COMPOSITIONS BASED ON POLYPHENYLENE ETHERS AND POLYOCTENYLENES, AND METHOD OF MANUFACTURING SAME

BACKGROUND OF THE INVENTION

1. Field of the Invention

The present invention relates to thermoplastic compositions based on polyphenylene ethers.

2. Description of the Background

Polyphenylene ethers are polymers which are characterized by having good thermal and electrical properties. In particular, poly(2,6-dimethyl-1,4-phenylene ether)(herein after, PPE) is a polyphenylene ether which has become industrially important.

Pure polyphenylene ethers are difficult to process due to their high viscosity in the molten state. Additionally, molded pieces produced from pure polyphenylene ethers have high softening temperatures, but poor impact resistance. In particular this poor impact resistance is observed with external notches, indentations, scores and the like.

There have been numerous means proposed for improving the processability and impact strength (the latter as measured by a notched-specimen impact test) of molded or formed pieces comprised of polyphenylene ethers. See e.g., German Pat. No. 1,694,255 (corresponding to U.S. Pat. No. 3,361,851), German Pat. No. 1,694,257 (corresponding to U.S. Pat. No. 3,383,435), and German Pat. No. 1,694,290 (corresponding to U.S. Pat. No. 3,379,792). Despite this prior work, it has been found that the addition of polyolefins, polystyrenes, and/or polyamides still do not optimally modify the properties of PPE-containing molded or formed pieces.

Mixtures of polyphenylene ethers with impact-resistant polystyrenes have become fairly important in industry (see German Pat. No. 2,119,301 and German Pat. No. 2,211,005). These mixtures can be processed into molded pieces having adequante impact strength, but they have the disadvantage that as the content of polystyrenes increases, the softening temperature decreases.

Consequently there has been no dearth of attempts to produce, from pure PPE and rubbers, processible compounds having high softening temperatures (German Pat. No. 2,107,935 and the rejected German OS No. 2,802,664). Apart from the fact that rubber is ordinarily available only in bale form, which cannot readily be metered, it is difficult to mix rubber into PPE with ordinary equipment, since both materials have high viscosities under processing conditions. Further, the result is compositions which are difficult to process in e.g., ordinary injection molding equipment.

It may be seen from the rejected European OS (laid-open document) No. 0,016,829 that in addition to rubbers obtained by the polymerization of butadiene and having the general formula

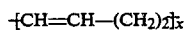

there are also now available polyalkenylenes of general formula:

The polyalkenylenes are obtained by ring-opening polymerization of cycloolefins. Here n is the number of ring atoms minus 2.

Polypentenylene is of particular interest, because molding compositions comprised of polyphenylene ethers and polypentenylenes or comprised of polyphenylene ether and a styrene resin modified with polypentenylene yield improved impact resistance. Apart from the fact that polypentenylene is no longer commercially available, it is similarly difficult to mix polypentenylene into polyphenylene ethers as it is to mix ordinary rubbers into polyphenylene ethers. Thus, in all the Examples offered in European OS No. 0,016,829, polystyrene resins or agents to improve processability (e.g., triphenyl phosphate) are employed as additives to the composition. It may be seen from German OS No. 31 38 401 that the molded pieces obtained according to European OS No. 0,016,829 need further improvement in weatherability and impact strength.

In German OS No. 31 38 401, molding compositions containing polyphenylene ethers and an impact resistant modified styrene polymer are claimed. A polyoctenylene with a glass transition temperature of $<-40°$ C. serves as a softening component of the styrene polymer. These mixtures do not yield any improvement in the impact resistance above that afforded by rubbers ordinarily employed as softening components.

Neither compositions based on polyphenylene ethers and polypentenylenes nor those based on polyphenylene ethers and impact-resistant styrene polymer modified with polyoctenylene as a softening component have revealed any particular advantages with respect to impact strength or softening temperature. Polyoctenylene-containing polyphenylene ethers are therefore not at all expected to be suitable for meeting the demanding conditions of high impact strength and simultaneous high softening temperatures of the molding compositions, not to mention the fact that mixing difficulties are posed. There is therefore a distinct need for a polyphenylene ether composition which is characterized by concomitant high impact strength and high softening temperature, and facile processability.

SUMMARY OF THE INVENTION

Accordingly, it is an object of this invention to provide a polyphenylene ether composition having high impact strength.

It is another object of this invention to provide a polyphenylene ether composition having high softening temperature.

It is another object of this invention to provide a polyphenylene ether compositions having good processability.

It is another object of this invention to provide a polyphenylene ether composition having high impact strength and softening temperature, and good processability.

These and other objects of this invention have been surprisingly met with the discovery that a thermoplastic composition comprised of (A) a polyphenylene ether, (B) a polymer for improving impact resistance, and (C) other additives, where the thermoplastic composition comprise a mixture of (A) 100 parts by wt. of polyphenylene ethers;
(B) 2–40 parts by wt. of polyoctenylene; and
(C) the following additives in amounts given as wt.% of the overall molding or forming composition:
up to 50 wt.% of reinforcing and filling materials;

up to 60 wt.% of condensation polymers;
up to 15 wt.% of flame retardants; and
up to 5 wt.% of other additives
are distinguished by high impact strength, high softening temperature, and good processability.

The present invention also provides a method for producing these polyphenylene ether compositions. In this method, the polyphenylene ether and/or the polyoctenylene are melted and mixed together along with the additives, if additives are used. Alternatively the polyphenylene ether and/or the polyoctenylene are dissolved in a suitable solvent. The composition is then obtained by removal of the solvent or precipitation therefrom.

DESCRIPTION OF THE PREFERRED EMBODIMENTS

The polyphenylene ether thermoplastic composition of this invention comprises:
(A) 100 parts by wt. of polyphenylene ethers;
(B) 2-40 parts by wt. of polyoctenylene; and
(C) the following additives in amounts given as wt.% of the overall molding or forming composition:
up to 50 wt.% of reinforcing and filling materials,
up to 60 wt.% of condensation polymers,
up to 15 wt.% of flame retardants; and
up to 5 wt.% of other additives.

Molding compositions with satisfactory impact strength can be produced even from polyphenylene ethers of very low J-value, e.g. J=36 ml/g (see Example 3.8).

In a preferred embodiment, the thermoplastic composition of this invention may be characterized in that the molding or forming compositions are subjected to a thermal treatment of at least 250° C. and a holding time (at that temperature) of at least 20 sec.

In another embodiment, the thermoplastic composition of this invention may also be characterized in that they comprise 4-12 parts by weight of polyoctenylenes.

In another embodiment, the thermoplastic composition of this invention may also be characterized in that a polymer of 2,6-dimethylphenol having a viscosity number of 40 to 65 ml/g (according to DIN 53 729) in chloroform at 25° C. is employed as the polyphenylene ether.

In another embodiment, the thermolastic composition of this invention may also be characterized in that 55-95%, preferably 75-85%, of the double bonds in the polyoctenylene are in the trans configuration.

The thermoplastic compostions of this invention can be prepared by the following method. The polyphenylene ether and/or the polyoctenylene (possibly along with the additives) is melted, and the two components are mixed.

In a preferred embodiment, a melting temperature of 250°-350° C., preferably 250°-300° C., is established, and holding times (at that temperature) of 0.3-10 min, preferably 0.5-3 min, are employed in the preparation of the compositions.

In another embodiment, the polyphenylene ether and/or the polyoctenylene is dissolved in a solvent suitable for dissolving both polymers. The thermoplastic compositions are then isolated by evaporating the solvent or by precipitation with a desolubilizing agent.

In another embodiment, after the mixing and the removal of the solvent, additional polyoctenylene is added to the preliminary molding composition obtained. This additional polyoctenylene is added by an operation or operations in which the preliminary composition and/or the additional polyoctenylene is melted (possibly along with the additional additives), and the components are mixed.

Polyoctenylenes are not rubbers in the narrow sense, since they act like thermoplastics under the processing conditions employed (see A. Draexler, *Kautschuk, Gummi, Kunststoffe* (Rubbers, Gums, Plastics), Vol. 12, pp. 1037-1043 (1983) (in German). At room temperature, polyoctenylenes act like low-melting additives which are used to increase processability, and show no indication of being suitable as agents to increase impact strength.

It is thus surprising that polyoctenylenes have a distinct effect on polyphenylene ethers of increasing impact strength, when they are subjected to specific thermal treatment. It is all the more surprising that this effect is greater than that provided by other polyalkenylenes, e.g. polypentenylenes or polydodecenylenes (see Examples 3.11, F, and G).

Within the scope of this invention, "thermoplastic compositions" should be understood to mean un-formed mixtures which can be processed into molded pieces or semi-fabricated products by means of thermoplastic processing. The thermoplastic compositions may be in the form of, e.g., pellets.

The chief candidates for the polyphenylene ether (A) in the above formulation are polyethers based on 2,6-dimethylphenol wherein the ether oxygen of a given unit is bound to the benzene nucleus of an adjoining unit. At least about 50 monomer units should be linked together in this manner.

Other candidates involve other 2,6-dialkylphenols in which the alkyl group may have, e.g., up to 6 C atoms, provided that the group does not have a tertiary carbon in the alpha position. Each monomeric phenol employed may have a methyl group substituted in the 3-position and possibly also in the 5-position. Obviously, mixtures of the mentioned monomeric phenols may also be employed.

The polyphenylene ethers may be prepared from the phenols, e.g. in the presence of complex-forming agents, such as copper bromide and morpholine (see German OSs Nos. 32 24 692 and 32 24 691). The viscosity values determined according to DIN 53 728 in chloroform at 25° C. are in the range 35-80 ml/g. The preferred polyphenylene either is a polymer of 2,6-dimethylphenol, viz. poly(2,6-dimethyl-1,4-phenylene) ether, with a viscosity value of 40-65 ml/g.

The physical form of the polyphenylene ethers employed is the customary powder or granulate.

The polyoctenylene (B) in the above formulation is prepared by the ring-opening and/or ring-expanding polymerization of cyclooctene (see, e.g., A Draexler, *Kautschuk, Gummi, Kunstoffe* (Rubbers, Gums, Plastics), pp. 185-190, 1981 (in German). Polyoctenylenes with different percentages of cis and trans- double bonds and different J-values (thus different molecular weights) can be prepared from known methods in the literature. Preferred polyoctenylenes have a viscosity number of 50 to 350 ml/g, preferably 80-160 ml/g, as measured in a 0.1% solution in toluene. It has 55-95%, preferably 75-85% trans double bonds.

The inventive molding compositions comprise polyoctenylene in the amount of 2-40 wt.%, preferably 4-12 wt., based on the weight of the polyphenylene ether components.

The inventive thermoplastic compositions may additionally be comprised of additives, such as a flame retardants, condensation polymers, pigments, oligomers and polymers, antistatic agents, stabilizers, agents which promote processibility as are well known in the art, e.g., plasticizers and lubricants, and reinforcing and filling materials. The reinforcing and filling materials may comprise up to 50 wt.% of the overall molding and forming composition, the condensation polymers up to 60 wt.%, the flame retardant up to 15 wt.%, and all over additives together up to 5 wt.%.

Particularly suitable flame retardants are aromatic phosphorus compounds such as triphenylphosphine oxide and triphenyl phosphate. Also, a halogenated flame retardant of the type commonly used may be employed; candidates are halogenated organic compounds such as described, e.g., in the monograph of H. Vogel, "Rendering plastics flame retardant", pub. Huethig-Verlag, 1966, pp. 94–102 (in German). Further candidates are halogenated polymers, e.g., halogenated polyphenylene ethers (see German OS No. 33 34 068) or brominated oligo- or polystyrenes. The halogenated compounds should comprise a halogen in the amount of more than 30 wt. %.

If a halogenated flame retardant is employed, the use of a synergist is recommended. Suitable synergists are compounds of antimony, boron, or tin. These are generally employed in the amount of 0.5–10 wt.% of the total thermoplastic composition.

Suitable polycondensates are at least predominantly aliphatic polyamides and polyalkylene terephthalates.

The polyamides may be homopolymers or copolymers, and are preferably of exclusively aliphatic structure. In particular the 6-, 6,4-, 6,6-, 6,12-, 11- and 12- polyamides may be mentioned. However, mixed aliphaticaromatic copolyamides are also suitable, provided the proportion of the basic aliphatic structural units predominate (compare U.S. Pat. Nos. 2,071,250, 2,071,251, 2,130,523, 2,130,948, 2,241,322, 2,312,966, 2,512,606 and 3,393,210; Kirk-Othmer, Encyclopedia of chemical technology, Vol. 18, John-Wiley & Sons (1982), pages 328 to 435.

The number-average molecular weight of the polyamides is greater than 5,000 and preferably greater than 10,000.

Poly(alkylene terephthalates) used in addition to poly(propylene terephthalate) are, preferably, poly(ethylene terephthalate) and poly(butylene terephthalate).

Up to 20 mol%, preferably 5 to 15 mol%, of the terephthalic acid in the poly(alkylene terephthalate) can be replaced by aromatic, cycloaliphatic or aliphatic dicarboxylic acids. Examples of suitable dicarboxylic acids are isophthalic acid, phthalic acid, cyclohexane-1,4-dicarboxylic acid, adipic acid, sebacic acid, azelaic acid, decanedicarboxylic acid or the like.

Up to 20 mol%, preferably 5 to 15 mol%, of the diol can be replaced by aliphatic or cycloaliphatic diols, such as, for example, ethylene glycol, propane-1,3-diol, butane-1,4-diol, hexane-1,6-diol, neopentyl glycol, 1,4-dimethylolcyclohexane, dodecane-1,12-diol or the like. The term poly(alkylene terephthalate) also includes block copolyesters. Such products are described, for example, in Chimia 28 (9), pages 544 to 552 (1974) and in Rubber Chemistry and Technology 50, pages 688 to 703 (1977). These block copolyesters contain, in addition to the abovementioned aromatic dicarboxylic acids and diols, a poly(oxalkylene)-diol having a molecular weight in the range from about 600 to 2,500. Preferred poly(oxyalkylene)-diols are poly(oxyethylene)-diol, poly(oxypropylene)-diol and poly(oxytetramethylene)-diol. The proportion of the poly(oxyalkylene)-diols lies within the range from 4 to 40% by weight, preferably from 10 to 35% by weight (based on the said block copolyester).

In addition to homopolyesters and copolyesters, it is also possible to employ polyester mixtures; the ratio in these mixtures is not critical.

For further details, reference may be made to DE-OS No. 34 01 345.

Suitable reinforcing and filling materials are in particular glass fibers or carbon fibers. A suitable filling material is titanium dioxide.

Suitable stabilizers include organic phosphites, e.g., didecyl phenyl phosphite and trilauryl phosphite, sterically hindered phenols, and derivatives of the following: tetramethylpiperidine, benzophenone, and triazole. Of course mixtures of stabilizers my be used.

Suitable agents for promoting processability are waxes, e.g. oxidized hydrocarbons and their alkali-and alkaline earth salts.

Essential features of the present invention are illustrated by the three preferred methods outlined below, by which the molding or forming compositions based on polyphenylene ethers and polyoctenylenes are produced. These preferred methods are provided for illustration of the invention and are not intended to be limiting thereof.

Method I: Melting and mixing of polyphenylene ethers and polyoctenylenes:

The characteristics feature of this method is the mixing of the two components in the molten state. The polyphenylene ether or the polyoctenylene is melted, and the resulting melt of the one polymer is mixed with the other polymer. Alternatively, as another possibility, the two polymers may be melted together and mixed.

The temperature and duration of the melting and mixing are important with regard to attaining optimum impact strength improvement. Preferably melting temperatures of 250°–350° C., particularly 250°–300° C. are used, with retention times (at such temperatures) of 0.3 to 10 min, particularly 0.5–3 min.

The usual apparatuses for handling high viscosity melts are suitable for the melting and mixing, with either batch or continuous operation. Particularly suitable are double-screw kneaders and co-kneaders.

Method II: Preparation of a common solution of polyphenylene ethers and polyoctenylenes, and removing the solvent:

The common solution may be prepared by dissolving both polymers in a suitable solvent, possibly respective different solvents, and combining these solutions. One may also seek a single solvent which dissolves both polymers. Suitable candidates for such versatile solvents are solvents in which the polymers are substantially completely soluble, particularly aromatic solvents, preferably toluene.

To separate the polymer mixture from the solvent, the solvent may be evaporated, or a desolubilizing agent such as, e.g., methanol may be added, whereby the polymer mixture is precipitated and subsequently dried.

The concentration of the polymer mixture in the solvent or the solvent mixtures is typically between 5 and 70 wt.%, preferably 10–20 wt.%.

Next after drying, the polymer mixture is processed with the additives at elevated temperatures. The temperature during additive incorporation should be greater than 250° C., with a holding time at such temperatures of at least 20 sec.

Method III: Melting and mixing of a preliminary molding or forming composition (produced according to Method II supra) with polyoctenylene, according to Method I supra:

In many cases it is advantageous to first produce a preliminary molding composition according to Method II, melt this composition, and combine this melt with additional polyoctenylene and the additives.

The additives may be added to the polymers in methods I and II or in a separate process stage, using the usual double screw extruder or co-kneader.

The inventive thermoplastic molding compositions may be processed to molded or formed pieces by the usual processes for fabricating thermoplastics, e.g., injection molding or extrusion. The products thus produced may be in the form of pipe or tubing, sheet, and other industrial forms. These are chiefly used in the automotive and electrical sectors, or for precision tooling and equipment.

Origin and Production of the Components:

1. Polyphenylene ethers and polyphenylene ether preliminary molding compositions:

1. The polyphenylene ethers are obtained by oxidative coupling of 2,6-dimethylphenol, interrupting the reaction at the desired J-value, and subsequent reaction-extraction, according German OSs Nos. 33 13 864 and 33 32 377.

1.1. A polyphenylene ether with J-value 52 ml/g was produced according to the general process described under (1). supra. The solvent was removed to evaporation, and the melt was extruded in a degassing extruder and then granulated.

1.2. Analogously to Example 1.1, a polyphenylene ether with J-value 69 ml/g was produced, extruded, and granulated.

1.3. Analogously to Example 1.1, a polyphenylene ether with J-value 72 ml/g was produced, extruded, and granulated.

1.4. The organic solution of a polyphenylene ether with a J-value of 55 ml/g was produced according to the general process method. The polymer was precipitated from the organic solution with methanol, and was processed to a dry powder.

1.5. A 10 wt.% organic solution of a polyphenylene ether with a J-value of 36 ml/g was produced according to the general process method.

1.6. A 10 wt.% organic solution of a polyphenylene ether with a J-value of 48 ml/g was produced according to the general process method.

1.7. A 10 wt.% organic solution of a polyphenylene ether with a J-value of 52 ml/g was produced according to the general process method. This solution was mixed with polyoctenylene according to Method II (supra), in the amount of 10 parts by wt. polyoctenylene per 100 parts by wt. polyphenylene ether.

1.8. A 10 wt.% organic solution of a polyphenylene ether with a J-value of 56 ml/g was produced according to the general process method. This solution was mixed with a polyalkenylene (as specified infra, Table 1) according to Method III (supra), in the amount of 10 parts by wt. of the polyalkenylene per 90 parts by wt. polyphenylene ether. The polymer mixture was then precipitated out by addition of methanol, and was processed to a dry powder.

2. Polyalkenylenes:

The following materials were used as the polyoctenylenes:

2.1. A polyoctenylene with a J-value of 120 ml/g and a trans content of 80%. Such a product is commercially available under the trade name "Vestenamer 8012" (mfd. by HÜLS AKTIENGESELLSCHAFT, D-4370 Marl 1, FRG). Additional characterizing data on this product maya be obtained from *Kautschuk, Gummi, Kunststoffe* (Rubbers, Gums, Plastics), pp. 185-190, 1981 (in German), and from Huels Pamphlet No. 2247, entitled (R) "Vestenamer ® 8012".

2.2. A polyoctenylene with a J-value of 70 ml/g and a trans content of 76%.

2.3. A polypentenylene with a J-value of 154 ml/g and a trans content of 89%.

2.4. A polydodecenylene with a J-value of 90 ml/g and a trans content of 81%. Due to the low solubility of the product in toluene, it was necessary to carry out the determination of J-value in decalin at 135° C.

Preparations: The polyalkenylenes may be prepared according to K. J. Ivin, "Olefin Metathesis", Academic Press, 1983 (in English), and the orginal literature cited therein.

Equipment: For the preparation, a "ZSK 30" double-screw kneader-mixer supplied by the firm Werner and Pfleiderer was used, which equipment has a conveying, a kneading, and a degassing zone.

For the molding or forming compositions produced according to Method I supra, a mixture of PPE and polyoctenylenes was melted. The cylinder temperature, processing temperature, and holding time at temperature are given in Table 1, infra.

For the molding compositions produced according to Examples 3.8 and 3.9 (see the Table), the polyalkenylene was dissolved in the toluene solution of the polyphenylene ether. The solution was then concentrated to 70 wt.%. The residual solvent was removed in a degassing extruder.

For the determination of the impact resistance ($a_k$) according to DIN 53 453, specimens were formed from the granulate in an injection molding machine with a cylinder temperature of 240°-260° C. and a mold temperature 90° C.

The Vicat softening temperature according to DIN 53 460 was determined on 4 mm thick pressed plates which had been fabricated at 250° C.

Obviously, numerous modifications and variations of the present invention are possible in light of the above teachings. It is therefore to be understood that within the scope of the appended claims, the invention may be practiced otherwise than as specifically described herein.

TABLE 1

| Example No. | PPE produced according to Example No. | Polyalkenyene produced according to Example No. | Parts by Weight PPE | Parts by Weight polyalkenylene | Parts by Weight triphenylphosphate | Cylinder temperature (°C.) | Holding time (sec.) | Processing temperature (°C.) | Impact resistance (KJ/m²) | Vicat (softening) temperature (DIN 53460) (°C.) A | Vicat (softening) temperature (DIN 53460) (°C.) B | Method of preparing the composition no. |
|---|---|---|---|---|---|---|---|---|---|---|---|---|
| A | 1.1 | — | 100 | — | — | — | — | 340 | 2.4 | 208 | 204 | I |
| 3.1 | 1.1 | 2.1 | 100 | 10 | — | 260 | 75 | 260 | 18 | 205 | 194 | I |
| 3.2 | 1.1 | 2.2 | 100 | 10 | — | 260 | 75 | 260 | 11 | 203 | 193 | I |
| B | 1.2 | — | 100 | — | — | 300 | 75 | 320 | 4.4 | 195 | 189 | I |
| 3.3 | 1.2 | 2.1 | 100 | 10 | — | 260 | 75 | 310 | 30 | 195 | 187 | I |
| C | 1.2 | — | 100 | — | 10 | 260 | 75 | 310 | 4.0 | 149 | 145 | I |
| 3.4 | 1.2 | 2.1 | 100 | 10 | 10 | 260 | 75 | 310 | 18 | 159 | 149 | I |
| D | 1.3 | — | 100 | — | — | — | — | 340 | 4.0 | 203 | 200 | I |
| 3.5 | 1.3 | 2.1 | 100 | 10 | — | 300 | 300 | 260 | 11 | 201 | 193 | I |
| 3.6 | 1.3 | 2.1 | 100 | 20 | — | 300 | 75 | 260 | 21 | 199 | 175 | I |
| E | 1.4 | — | 100 | — | (1) | 260 | 75 | 280 | 7.0 | 205 | 195 | I |
| 3.7 | 1.4 | — | 100 | — | (1) | 260 | 75 | 300 | 40 | 198 | 190 | I |
| 3.8 | 1.5 | 2.1 | 100 | 10 | — | — | — | 260 | 10 | 202 | 193 | II |
| 3.9 | 1.6 | 2.1 | 100 | 10 | — | — | — | 280 | 17 | 202 | 194 | II |
| 3.10 | 1.7 | 2.1 | 100 | 20 | — | 260 | 75 | 260 | 11 | 198 | 179 | III |
| 3.11 | 1.8 | 2.1 | 90 | 10 | (1) (2) | 260 | 75 | 280 | 26.3 | 200 | 190 | III |
| F | 1.8 | 2.3 | 90 | 10 | (1) (2) | 260 | 75 | 280 | 25.0 | 199 | 189 | III |
| G | 1.8 | 2.4 | 90 | 10 | (1) (2) | 260 | 75 | 280 | 19.4 | 206 | 195 | III |

Footnotes to Table 1:
(1) In compounding, 0.5 wt. % didecyl phenyl phosphite and 0.5 wt. % octadecyl 3-(3,5-di-tert-butyl-4-hydroxyphenyl)propionate was added to the polyphenylene ether and to the mixture of polyphenylene ether and polyalkenylene.
(2) In compounding, 1.5 wt. % of an oxidized polyethylene wax with m.w. 1,500 was added to the mixture of polyphenylene ether and polyalkenylene. Such a product may be prepared in known fashion by oxidizing polyethylene. It is commercially available under the trade name "Vestowax AO 1539" (mfd. by Chemische Werke Huels AG, D-4370 Marl 1, FRG).

What is claimed as new and desired to be secured by Letters Patent of the United States is:

1. A thermoplastic composition, comprising:
   (A) 100 parts by wt. of a polyphenylene ether; and,
   (B) 2-40 parts by wt. of a polyoctenylene prepared by ring-opening, ring expanding or both ring opening and ring expanding polymerization of cyclooctene.

2. The thermoplastic composition of claim 1, wherein said composition comprises as an additive up to 50 wt.% of a reinforcing and filling material, up to 60 wt.% of condensation polymers, or up to 15 wt.% of a flame retardant.

3. The thermoplastic composition of claim 1, wherein said thermoplastic composition is a molding or a forming composition.

4. The thermoplastic composition of claim 1; wherein the composition is subjected to a thermal treatment at a temperature of at least 250° C. and a holding time (at said temperature) of at least 20 sec.

5. The thermoplastic composition of claim 1, wherein said composition comprises 4-12 parts by weight of a polyoctenylene.

6. The thermoplastic composition of claim 1, wherein said polyphenylene ether comprises a polymer of 2,6-dimethylphenol having a viscosity number of 40 to 65 ml/g, in chloroform at 25° C. according to DIN 53 729.

7. The thermoplastic composition of claim 1, wherein said polyoctenylene has a viscosity number of 50-350 ml/g as determined from a 0.1 wt.% solution in toluene, according to DIN 53 728.

8. The thermoplastic composition of claim 1, wherein said polyoctenylene has a viscosity number of 80-160 as determined from a 0.1 wt.% solution in toluene, according to DIN 53 728.

9. The thermoplastic composition of claim 1, wherein said polyoctenylene has 55-95% of its double bonds in the trans configuration.

10. The thermoplastic composition of claim 1, wherein said polyoctenylene has 75-85% of its double bonds in the trans configuration.

11. A method for producing the thermoplastic composition of claim 1, wherein said polyphenylene ether or said polyoctenylene are melted, and the two components mixed.

12. A method for producing the thermoplastic composition of claim 2, wherein said polyphenylene ether or said polyoctenylene and said additive are melted, and said polyphenylene ether and said polyoctenylene and said additive are mixed.

13. The method of claim 11, wherein a melting temperature of 250°-350° C. is established, and a holding time (at temperature) of 0.3-10 min, is employed.

14. The method of claim 11, wherein a melting temperature of 250°-300° C. is established, and a holding time (at said temperature) of 0.5-3 min, is employed.

15. A method for producing the thermoplastic composition of claim 1, wherein said polyphenylene ether or said polyoctenylene are dissolved in a solvent suitable for dissolving both polymers, said polyphenylene ether and said polyoctenylene are then mixed, and the said thermoplastic composition is isolated by evaporating the solvent or by precipitation with a de-solubilizing agent.

16. The method of claim 15, wherein after said mixing and said isolation of said composition, additional polyoctenylene is added to the composition obtained by an operation comprising melting said composition or said additional polyoctenylene and mixing said composition with said additional polyoctenylene.

17. A method for producing the thermoplastic composition of claim 2, wherein said polyphenylene ether or said polyoctenylene and said additive are dissolved in a solvent, said polyphenylene and said polyoctenylene and said additive are then mixed, and the said thermoplastic composition is isolated by evaporating the solvent or by precipitation with a desolubilizing agent, wherein after said mixing and said isolation of said composition, additional polyoctenylene and additives are added to the composition obtained, by an operation comprising melting said composition or said additional polyoctenylene and said additive, and mixing said composition with said additional polyoctenylene and said additive.

* * * * *